US010904438B1

(12) United States Patent
Youm

(10) Patent No.: US 10,904,438 B1
(45) Date of Patent: Jan. 26, 2021

(54) CONTROLLER INTEGRATED CIRCUIT (IC) AND ACTUATOR OF CAMERA MODULE INCLUDING THE SAME

(71) Applicant: Samsung Electro-Mechanics Co., Ltd., Suwon-si (KR)

(72) Inventor: Jung Eun Youm, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/850,169

(22) Filed: Apr. 16, 2020

(30) Foreign Application Priority Data

Dec. 27, 2019 (KR) .......................... 10-2019-0176426

(51) Int. Cl.
| H04N 5/232 | (2006.01) |
| H02P 25/034 | (2016.01) |
| G03B 17/12 | (2006.01) |
| G03B 5/02 | (2006.01) |

(52) U.S. Cl.
CPC ............. *H04N 5/2328* (2013.01); *G03B 5/02* (2013.01); *G03B 17/12* (2013.01); *H02P 25/034* (2016.02); *G03B 2205/0069* (2013.01)

(58) Field of Classification Search
CPC ............. H04N 5/2328; H04N 5/23287; H02P 25/034; H02P 25/028; H02P 23/20; H02P 23/0027; G03B 5/02; G03B 17/12; G03B 2205/0069; G05B 13/044; H02K 41/0354
USPC ...................................................... 348/208.2
See application file for complete search history.

(56) References Cited

U.S. PATENT DOCUMENTS

| 4,697,127 A * | 9/1987 | Stich .................... G05D 3/1454 318/561 |
| 5,223,778 A * | 6/1993 | Svarovsky ............. G05B 11/42 318/609 |
| 5,971,579 A * | 10/1999 | Kim .................... G05B 13/0265 700/42 |
| 6,046,560 A * | 4/2000 | Lu ........................ B62D 5/0463 180/443 |
| 6,118,616 A * | 9/2000 | Jeong ..................... G11B 19/04 360/78.07 |
| 6,335,845 B1 * | 1/2002 | Yamaguchi ............ G11B 5/553 360/75 |
| 8,952,644 B2 * | 2/2015 | Youm .................. G05B 13/044 318/561 |
| 9,906,181 B2 * | 2/2018 | Kang ................... H02P 25/034 |
| 10,197,763 B2 * | 2/2019 | Cheong .................... G03B 3/10 |

(Continued)

FOREIGN PATENT DOCUMENTS

| KR | 10-1180055 B1 | 9/2012 |
| KR | 10-2016-0126915 A | 11/2016 |
| KR | 10-2017-0069060 A | 6/2017 |

*Primary Examiner* — Pritham D Prabhakher
(74) *Attorney, Agent, or Firm* — NSIP Law

(57) ABSTRACT

An actuator of a camera module includes a comparison unit sequentially calculating each error value by comparing a target position with a current position of a lens barrel, a controller integrated circuit (IC) generating a control signal by applying a control gain based on a proportional-integral-derivative (PID) control scheme to each error value sequentially input thereto from the comparison unit, and a driving circuit unit generating a driving signal in response to the control signal to move the lens barrel to the target position, wherein the controller IC changes the control gain in response to the error values sequentially input including both overshoot and undershoot.

19 Claims, 3 Drawing Sheets

(56) References Cited

U.S. PATENT DOCUMENTS

| | | | |
|---|---|---|---|
| 10,212,360 B2* | 2/2019 | Ryu | H04N 5/2252 |
| 10,241,348 B2* | 3/2019 | Bang | G03B 5/00 |
| 2002/0186625 A1* | 12/2002 | Hung | G11B 7/08511 |
| | | | 369/44.29 |
| 2014/0111132 A1* | 4/2014 | Youm | H02P 23/20 |
| | | | 318/561 |
| 2016/0315573 A1 | 10/2016 | Kang | |
| 2016/0353004 A1* | 12/2016 | Cheong | G02B 7/09 |
| 2018/0278853 A1* | 9/2018 | Ryu | H04N 5/2252 |

* cited by examiner

CONTROLLER INTEGRATED CIRCUIT (IC) AND ACTUATOR OF CAMERA MODULE INCLUDING THE SAME

CROSS-REFERENCE TO RELATED APPLICATIONS

This application claims the benefit under 35 USC 119(a) of Korean Patent Application No. 10-2019-0176426 filed on Dec. 27, 2019, in the Korean Intellectual Property Office, the entire disclosure of which is incorporated herein by reference for all purposes.

BACKGROUND

1. Field

The present disclosure relates to a controller integrated circuit (IC) and an actuator of a camera module including the same.

2. Description of the Background

Recently, portable communications terminals, such as cellular phones, personal digital assistants (PDAs), portable personal computers (PCs) or the like, have generally been implemented with the ability to perform the transmission of video data as well as the transmission of text or audio data. In accordance with such a trend, camera modules have become standard in the recent portable communications terminals in order to enable the transmission of the video data, video chatting or the like.

In general, the camera module may include a lens barrel disposing lenses therein, a housing accommodating the lens barrel, and an image sensor converting an image of a subject into an electrical signal. The camera module may be implemented as a single focus type camera module capturing an image of a subject by a fixed focus, but may be implemented as a camera module including an actuator having an autofocusing (AF) function recently as technology has developed. In addition, the camera module may include an actuator having an optical image stabilization (OIS) function in order to suppress a resolution decrease phenomenon due to handshake.

In order to precisely control the autofocusing and shake correction functions used in the camera module, the lens barrel needs to be displaced to a target position thereof. However, due to disturbance, the displacement of the lens barrel may fail to converge to the target position and oscillate.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator of a camera module includes a comparison unit sequentially calculating each error value by comparing a target position with a current position of a lens barrel, a controller integrated circuit (IC) generating a control signal by applying a control gain based on a proportional-integral-derivative (PID) control scheme to each error value sequentially input thereto from the comparison unit, and a driving circuit unit generating a driving signal in response to the control signal to move the lens barrel to the target position, wherein the controller IC changes the control gain in response to the error values sequentially input including both overshoot and undershoot.

The controller IC may determine that a first oscillation occurs in response to the error values sequentially input comprising both overshoot and undershoot after elapse of a settling time.

The controller IC may change an initial control gain of the control signal to a first compensation control gain in response to the first oscillation.

The first compensation control gain may include a higher integral control gain and a lower derivative control gain than the initial control gain.

The controller IC may determine that a second oscillation occurs in response to the error values sequentially input comprising one or more of overshoot and undershoot after the first oscillation.

The controller IC may change the first compensation control gain of the control signal to a second compensation control gain in response to the second oscillation.

The second compensation control gain may include a higher integral control gain and a lower derivative control gain than the first compensation control gain.

The controller IC may set the second compensation control gain as an initial control gain of a next control section in response to the second oscillation.

The controller IC may maintain the first compensation control gain as the control gain of a current control section and reset an initial control gain of a next control section to a default value in response to a determination of no second oscillation.

A camera module may include the actuator, a housing accommodating the lens barrel capturing an image of a subject, and an image sensor converting the image of the subject into an electrical signal.

In another general aspect, a controller integrated circuit (IC) includes an oscillation determination unit determining oscillation of each error value sequentially input in one control section at least twice, a control gain change unit changing a control gain applied to the error value based on a result of the oscillation determination of the oscillation determination unit, and a control signal generation unit generating a control signal by applying the control gain changed by the control gain change unit to the error value, wherein the oscillation determination unit determines that a first oscillation occurs in a case in which an error value at one time point is greater than a first reference value and an error value at another time point is less than a second reference value among the error values sequentially input.

The first reference value may be greater than the second reference value.

The oscillation determination unit may determine whether or not the first oscillation occurs after a settling time of the error value.

The oscillation determination unit may change an initial control gain of the control signal to a first compensation control gain in a case in which the first oscillation occurs, and the first compensation control gain has a higher integral control gain and a lower derivative control gain than the initial control gain.

The oscillation determination unit may determine that a second oscillation occurs in a case in which an error value at one time point is greater than the first reference value or less than the second reference value among the error values sequentially input after the first oscillation occurs.

The control gain change unit may change the first compensation control gain of the control signal to a second compensation control gain in a case in which the second oscillation occurs, and the second compensation control gain may have a higher integral control gain and a lower derivative control gain than the first compensation control gain.

The control section may correspond to a frame unit of an image signal output from an image sensor.

In another general aspect, an a camera module includes an actuator configured to move a lens barrel in one or more of an optical axis direction, a first direction perpendicular to the optical axis, and a second direction perpendicular to the optical axis, a housing accommodating the lens barrel, and an image sensor configured to convert an image of a subject captured by the lens barrel into an electrical signal, wherein the actuator includes a comparison unit configured to sequentially compare a target position with a current position of the lens barrel to determine sequential error values, a controller integrated circuit (IC) configured to sequentially receive each error value and apply a control gain based on a proportional-integral-derivative (PID) control scheme to each error value to generate a control signal, and a driving circuit unit configured to generate a driving signal in response to the control signal to move the lens barrel to the target position, wherein the controller IC is configured to change the control gain in response to overshoot and undershoot of the sequential error values.

The controller IC may further include an oscillation determination unit configured to determine the overshoot in response to an error value at one time point being greater than a first reference value and the undershoot in response to an error value at another time point being less than a second reference value from the sequential error values.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
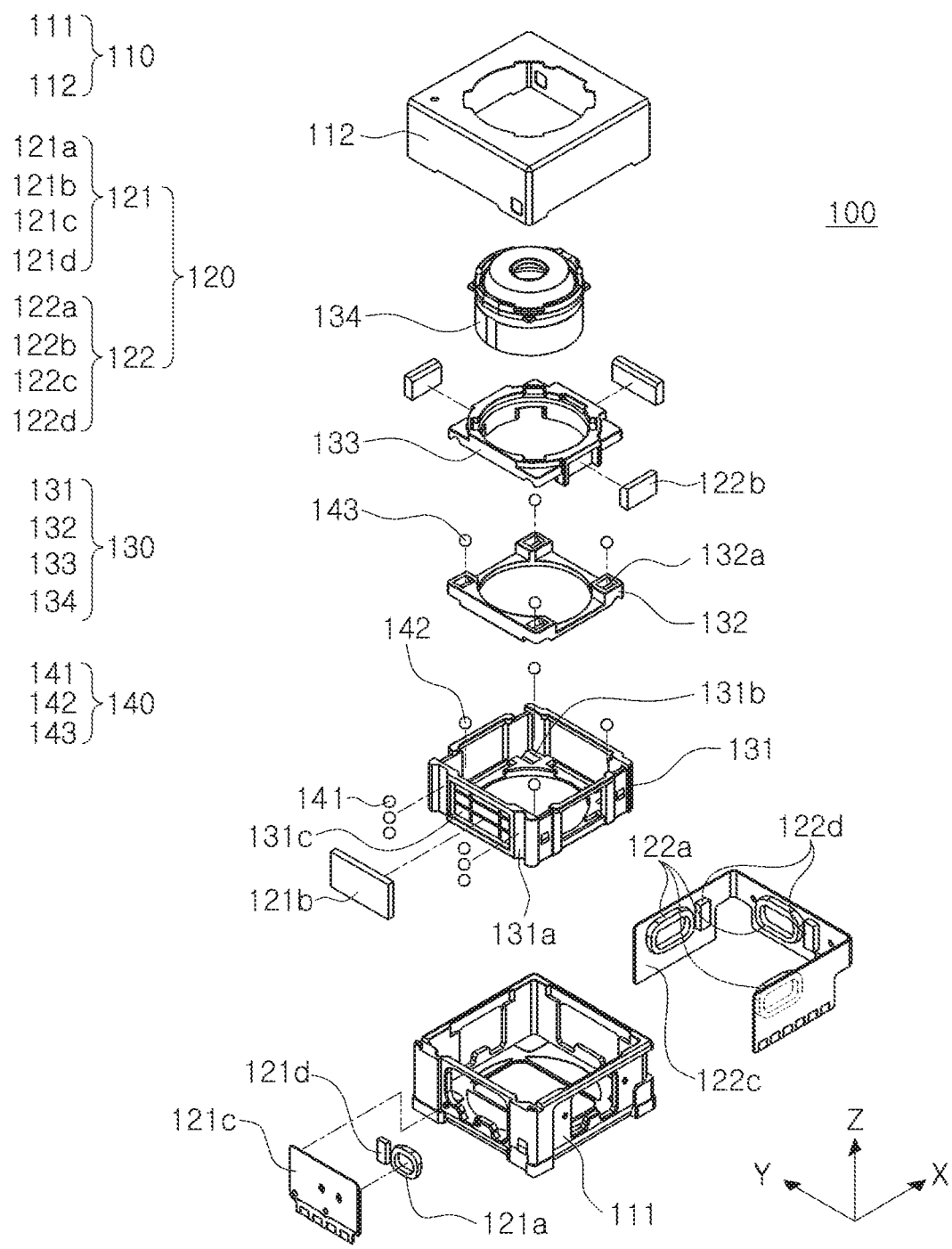
FIG. 1 is an exploded perspective view illustrating a camera module according to one or more examples of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure may provide a controller integrated circuit (IC) and an actuator of a camera module including the same, which are capable of determining whether or not an error value is in an oscillation state by comparing each error value sequentially input with reference values thereof, and moving a lens barrel to a target position thereof by changing a control gain when it is determined that the error value is in the oscillation state.

FIG. 1 is an exploded perspective view showing a camera module according to one or more examples of the present disclosure.

Referring to FIG. 1, a camera module 100 according to one or more examples may include a housing unit 110, an actuator 120 and a lens module 130, and further include a ball bearing unit 140.

The camera module 100 may have at least one of an autofocusing function and an optical image stabilization function. For example, in order for the camera module 100 to perform the autofocusing and optical image stabilization functions, the lens module 130 may be moved in the housing unit 110 in each of an optical axis direction and directions perpendicular to the optical axis.

The housing unit 110 may include a housing 111 and a shield case 112. The housing 111 may be formed of a material that is easily molded. For example, the housing 111 may be formed of plastic. At least one actuator 120 may be mounted in the housing 111. For example, some components of a first actuator 121 may be mounted on a first side surface of the housing 111, and some components of a second actuator 122 may be mounted on second, third, and fourth side surfaces of the housing 111. The housing 111 may be configured to accommodate the lens module 130. For example, the housing 111 may have a space accommodating the lens module 130 completely or partially.

Six surfaces of the housing 111 may be open. For example, a hole for an image sensor may be formed on a bottom surface of the housing 111, and a rectangular hole for mounting the lens module 130 may be formed on a top surface of the housing 111. In addition, the first side surface of the housing 111 may be open so that a first driving coil 121a of the first actuator 121 may be inserted thereinto, and the second to fourth side surfaces of the housing 111 may be open so that second driving coils 122a of the second actuator 122 may be inserted thereinto.

The shield case 112 may be configured to cover a portion of the housing 111. For example, the shield case 112 may be configured to cover the top surface and four side surfaces of the housing 111. Alternatively, the shield case 112 may be configured to cover only the four side surfaces of the housing 111 or may be configured to partially cover the top surface and the four side surfaces of the housing 111. The shield case 112 may block electromagnetic waves occurring during driving of the camera module. The electromagnetic waves may occur when driving the camera module, and in case of being emitted outwardly from the camera module, the electromagnetic waves may affect other electronic components to cause communications errors between the electronic components or malfunctions thereof. In order to prevent such a problem, the shield case 112 may be formed of a metal and be grounded to a ground pad of a substrate mounted on the bottom surface of the housing 111 to block the electromagnetic waves.

The number of actuators 120 may be plural. For example, the actuator 120 may include the first actuator 121 configured to move the lens module 130 in a Z-axis direction and the second actuator 122 configured to move the lens module 130 in an X-axis direction and a Y-axis direction.

The first actuator 121 may be mounted on the housing 111 and a first frame 131 of the lens module 130. For example, some components of the first actuator 121 may be mounted on the first side surface of the housing 111, and other components of the first actuator 121 may be mounted on a first side surface of the first frame 131. The first actuator 121 may move the lens module 130 in the optical axis direction (the Z-axis direction). For example, the first actuator 121 may include the first driving coil 121a, a first magnet 121b, a first substrate 121c and a first position detector 121d. The first driving coil 121a and the first position detector 121d may be formed on the first substrate 121c. The first substrate 121c may be mounted on the first side surface of the housing 111, and the first magnet 121b may be mounted on the first side surface 131c of the first frame 131 facing the first substrate 121c.

A first driving device (not shown) providing a driving signal to the first driving coil 121a may be provided on the first substrate 121c. The first driving device may apply the driving signal to the first driving coil 121a to provide the first magnet 121b with driving force. The first driving device may include a driver integrated circuit (IC) providing the driving signal to the first driving coil 121a. For example, when the driving signal is applied from the first driving device to the first driving coil 121a, a magnetic flux may be generated in the first driving coil 121a. Here, the magnetic flux generated in the first driving coil 121a may interact with a magnetic field of the first magnet 121b to generate driving force enabling relative movement of the first frame 131 and a lens barrel 134 with respect to the housing 111 in accordance with Fleming's left hand rule. The first driving device may include a bidirectionally driven H-bridge circuit, and may thus apply the driving signal to the first driving coil 121a.

The lens barrel 134 may be moved in the same direction as the first frame 131 by movement of the first frame 131. The first actuator 121 may sense magnitude of the magnetic field generated by the first magnet 121b using the first position detector 121d, and thus detect positions of the first frame 131 and the lens barrel 134. For example, the first position detector 121d may include a hall sensor.

The second actuator 122 may be mounted on the housing 111 and a third frame 133 of the lens module 130. For example, some components of the second actuator 122 may be mounted on the second to fourth side surfaces of the housing 111, and other components of the second actuator 122 may be mounted on second to fourth side surfaces of the third frame 133. The second actuator 122 may be mounted on some of the first to fourth side surfaces of the housing 111 and the third frame 133, or may be mounted on second to fourth corners including at which the second to fourth side surfaces are in contact with each other.

The second actuator 122 may include components for moving the lens module 130 in the directions perpendicular to the optical axis. For example, the second actuator 122 may include a plurality of second driving coils 122a, a plurality of second magnets 122b, a second substrate 122c and a second position detector 122d.

The plurality of second driving coils 122a and the second position detectors 122d may be formed on the second substrate 122c. The second substrate 122c may substantially have a rectangular shape of which one side is open, and be mounted to surround the second to fourth side surfaces of the housing 111. The plurality of second magnets 122b may be mounted on the second to fourth side surfaces of the third frame 133, respectively, to face the second substrate 122c.

A second driving device (not shown) providing driving signals to the second driving coils 122a may be provided on the second substrate 122c. The second driving device may apply the driving signals to the second driving coils 122a to provide the second magnets 122b with driving force. The second driving device may include a driver integrated circuit (IC) providing the driving signals to the second driving coils 122a. For example, when the driving signals are provided from the second driving device to the second driving coils 122a, magnetic fluxes may be generated from the second driving coils 122a. Here, the magnetic fluxes generated from the second driving coils 122a may interact with magnetic fields of the second magnets 122b. The second driving device may change magnitudes and directions of magnetic force generated between the plurality of second driving coils 122a and the plurality of second magnets 122b to enable relative movement of a second frame 132 or the third frame 133 with respect to the first frame 131. The second driving device may include a bidirectionally driven H-bridge circuit to apply the driving signals to the second driving coils 220.

The lens barrel 134 may be moved in the same direction as the second frame 132 or the third frame 133 by the movement of the second frame 132 or the third frame 133. The second actuator 122 may sense magnitudes of the magnetic fields generated by the second magnets 122b using the second position detectors 122d to detect positions of the lens barrel 134 and the second and third frames 132 and 133. For example, the second position detectors 122d may include hall sensors. The second position detectors 122d may include at least two hall sensors to detect positions of the lens barrel 134 and the second and third frames 132 and 133 in the two directions perpendicular to the optical axis.

The lens module 130 may be mounted in the housing unit 110. For example, the lens module 130 may be accommodated in an accommodation space formed by the housing 111 and the shield case 112 to be movable in at least three axis directions. The lens module 130 may include a plurality of frames. For example, the lens module 130 may include the first frame 131, the second frame 132 and the third frame 133.

The first frame 131 may be configured to be movable with respect to the housing 111. For example, the first frame 131 may be moved in the optical axis direction (the Z-axis direction) of the housing 111 by the first actuator 121. A plurality of guide grooves 131a and 131b may be formed in the first frame 131. For example, a first guide groove 131a extended to be elongated in the optical axis direction (the Z-axis direction) may be formed in the first side surface of the first frame 131, and second guide grooves 131b extended to be elongated in a first direction (the Y-axis direction) perpendicular to the optical axis may be formed in four corners of an inner bottom surface of the first frame 131, respectively. The first frame 131 may be manufactured so that at least three side surfaces thereof are open. For example, second to fourth side surfaces of the first frame 131 may be open so that the second magnets 122b mounted on the third frame 133 and the second driving coils 122a mounted on the housing 111 may face each other.

The second frame 132 may be mounted in the first frame 131. For example, the second frame 132 may be mounted in an internal space of the first frame 131. The second frame 132 may be configured to be moved in the first direction (the Y-axis direction) perpendicular to the optical axis with respect to the first frame 131. For example, the second frame 132 may be moved in the first direction (the Y-axis direction) perpendicular to the optical axis along the second guide grooves 131b of the first frame 131. A plurality of guide grooves 132a may be formed in the second frame 132. For example, four third guide grooves 132a extended to be elongated in a second direction (the X-axis direction) perpendicular to the optical axis may be formed in corners of the second frame 132, respectively.

The third frame 133 may be mounted on the second frame 132. For example, the third frame 133 may be mounted on a top surface of the second frame 132. The third frame 133 may be configured to be moved in the second direction (the X-axis direction) perpendicular to the optical axis with respect to the second frame 132. For example, the third frame 133 may be moved in the second direction (the X-axis direction) perpendicular to the optical axis along the third guide grooves 132a of the second frame 132. The plurality of second magnets 122b may be mounted on the third frame 133. For example, at least two second magnets 122b may be mounted on the second to fourth side surfaces of the third frame 133, respectively. Alternatively, for example, three second magnets 122b may be mounted on the second to fourth side surfaces of the third frame 133, respectively. The lens module 130 may include the lens barrel 134. For example, the lens module 130 may include the lens barrel 134 including one or more lenses. The lens barrel 134 may have a hollow cylindrical shape to accommodate at least one lens capturing an image of a subject, and the lens may be provided in the lens barrel 134 along the optical axis. At least one lens may be stacked by the same number as the number of the designed lens barrel 134, and have optical characteristics such as the same refractive index or different refractive indices or the like.

The lens barrel 134 may be mounted in the third frame 133. For example, the lens barrel 134 may be fitted into the third frame 133 to thus be moved integrally with the third frame 133. The lens barrel 134 may be configured to be moved in the optical axis direction (the Z-axis direction) and the directions (the X-axis and Y-axis directions) perpendicular to the optical axis. For example, the lens barrel 134 may be moved in the optical axis direction (the Z-axis direction) by the first actuator 121, and be moved in the directions (the X-axis and Y-axis directions) perpendicular to the optical axis by the second actuator 122.

The ball bearing unit 140 may guide the movement of the lens module 130. For example, the ball bearing unit 140 may be configured so that the lens module 130 is moved smoothly in the optical axis direction and the directions perpendicular to the optical axis. The ball bearing unit 140 may include first ball bearings 141, second ball bearings 142 and third ball bearings 143. For example, the first ball bearings 141 may be disposed in the first guide groove 131a of the first frame 131 so that the first frame 131 is moved smoothly in the optical axis direction. For another example, the second ball bearings 142 may be disposed in the second guide grooves 131b of the first frame 131 so that the second frame 132 is moved smoothly in the first direction perpendicular to the optical axis. For another example, the third ball bearings 143 may be disposed in the third guide grooves 132a of the second frame 132 so that the third frame 133 is moved smoothly in the second direction perpendicular to the optical axis.

Each of the first and second ball bearings 141 and 142 may include at least three balls, and the at least three balls of each of the first and second ball bearings 141 and 142 may be disposed in the first or second guide grooves 131a or 131b, respectively.

A lubricating material for reducing friction and noise may be filled in all the portions in which the ball bearing unit 140 is disposed. For example, a viscous fluid may be injected into the respective guide grooves 131a, 131b and 132a. Grease having excellent viscosity and lubricating characteristics may be used as the viscous fluid.

Figure 2:
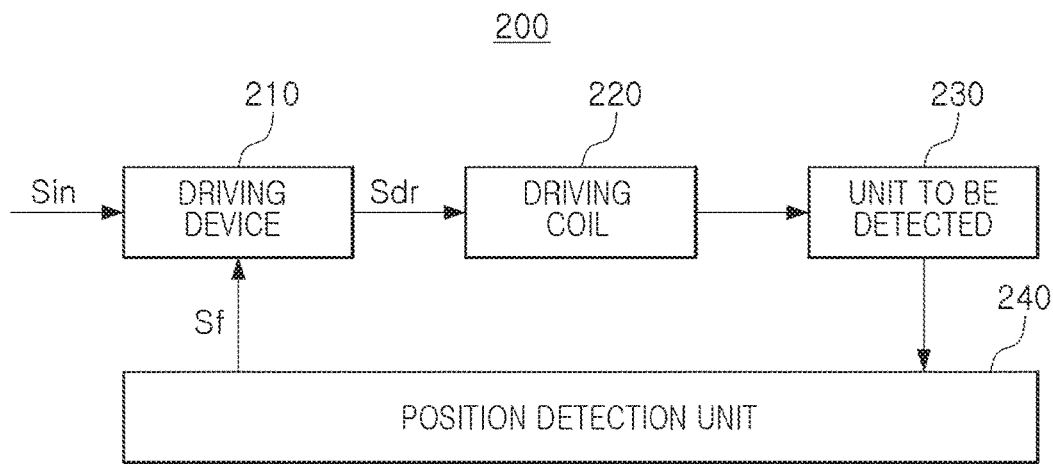
FIG. 2 is a block diagram showing main components of an actuator used in the camera module according to one or more examples of the present disclosure.

FIG. 2 is a block diagram showing main components of an actuator used in the camera module according to one or more examples of the present disclosure.

An actuator 200 according to one or more examples may include a driving device 210, a driving coil 220, a target unit 230 to be detected and a position detection unit 240. The actuator 200 according to the present example in FIG. 2 may correspond to the first actuator 121 or the second actuator 122 in FIG. 1.

When the actuator 200 in FIG. 2 corresponds to the first actuator 121 in FIG. 1, the actuator 200 may move the lens barrel in the optical axis direction in order to perform the autofocusing (AF) function of the camera module. Therefore, when the actuator 200 in FIG. 2 performs the autofocusing function, the driving device 210 may apply a driving signal to the driving coil 220 to provide the magnet with driving force in the optical axis direction.

In addition, when the actuator 200 in FIG. 2 corresponds to the second actuator 122 in FIG. 1, the actuator 200 may move the lens barrel in the directions perpendicular to the optical axis in order to perform the optical image stabilization (OIS) function of the camera module. Therefore, when the actuator 200 in FIG. 2 performs the OIS function, the driving device 210 may apply the driving signal to the driving coil 220 to provide the magnet with driving force in the directions perpendicular to the optical axis.

The driving device 210 may generate a driving signal Sdr based on an input signal Sin input from an external source and a feedback signal Sf generated from the position detection unit 240, and may provide the driving coil 220 with the generated driving signal Sdr. A target position of the lens barrel may be determined by the input signal Sin.

When the driving signal Sdr is applied from the driving device 210 to the driving coil 220, the lens barrel may be moved in a direction by electromagnetic interaction between the driving coil 220 and the magnet.

The target unit 230 to be detected may be provided at one side of the lens barrel to be moved in the same direction as the lens barrel. According to another example, the target unit 230 to be detected may be provided on one or more of a carrier and a plurality of frames coupled to the lens barrel, in addition to the lens barrel.

The target unit 230 to be detected may be formed of one of a magnetic material and a conductor. For example, the target unit 230 to be detected may correspond to the first magnet 121b or the second magnets 122b in FIG. 1. A separate element may be provided to implement the target unit 230 to be detected according to another example.

The position detection unit 240 may detect a position of the target unit 230 which is moved by the electromagnetic interaction between the magnet and the driving coil 220 to generate a feedback signal Sf, and provide the driving device 210 with the feedback signal Sf.

The position detection unit 240 may include a position detector and an analog-digital converter. The position detector of the position detection unit 240 may correspond to the first position detector 121d or the second position detector 122d in FIG. 1. The position detector may detect the position of the lens barrel by detecting magnitude of the magnetic field of the target unit 230. The analog-to-digital converter may convert an analog signal output from the position detector into a digital signal.

When the feedback signal Sf is provided to the driving device 210, the driving device 210 may compare the input signal Sin with the feedback signal Sf to generate the driving signal Sdr again. That is, the driving device 210 may be driven in a closed-loop type in which the input signal Sin and the feedback signal Sf are compared with each other. The closed-loop type driving device 210 may be driven to reduce an error between a target position of the lens barrel included in the input signal Sin and a current position of the lens barrel determined based on the feedback signal Sf. The closed-loop type driving may have improved linearity, accuracy and repeatability than an open-loop system type.

The driving device 210 may include the bidirectionally driven H-bridge circuit to apply the driving signals to the driving coil 220, for example, the second driving coils 122a.

Figure 3:
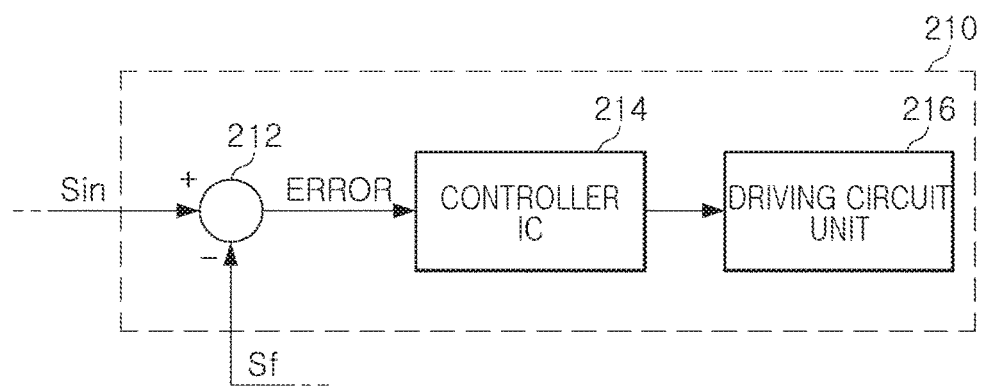
FIG. 3 is a block diagram showing a driving device used in the actuator according to one or more examples of the present disclosure.

FIG. 3 is a block diagram showing a driving device used in the actuator according to one or more examples of the present disclosure.

The driving device 210 may include a comparison unit 212, a controller integrated circuit (IC) 214 and a driving circuit unit 216.

The comparison unit 212 may compare the input signal Sin with the feedback signal Sf. The comparison unit 212 may calculate an error value by comparing the target position of the lens barrel included in the input signal Sin with the current position of the lens barrel included in the feedback signal Sf. For example, the comparison unit 212 may sequentially calculate each error value by comparing the input signal Sin with the feedback signal Sf. A movement distance and a movement direction of the lens barrel may be determined by the error value calculated in the comparison unit 212.

The controller IC 214 may generate a control signal by applying a control gain to the error value provided from the comparison unit 212. For example, the controller IC 214 may include a proportional-integral-derivative (PID) controller to perform a PID-type control. The controller IC 214 may generate the control signal by applying the control gain based on a PID control scheme.

The controller IC 214 may perform a control proportional to magnitude of the error value in a current state based on a proportional control, perform a control for reducing an error in a steady state based on an integral control and perform a control for preventing a rapid change to reduce overshoot based on a derivative control.

The PID-type control may be represented by Equation 1. $K_P$ may denote a proportional control gain, $K_I$ may denote an integral control gain, $K_D$ may denote a derivative control gain and e(t) may denote a function indicating a change in the error value.

$$u(t) = K_P e(t) + K_I \int e(t)dt + K_D \frac{de(t)}{dt} \qquad \text{Equation 1}$$

When performing the PID-type control, the controller IC 214 may generate the control signal by applying each of the proportional control gain $K_P$, the integral control gain $K_I$ and the derivative control gain $K_D$ to the error value corresponding to a difference between the target position of the lens barrel and the current position of the lens barrel.

The driving circuit unit 216 may generate a driving signal based on the control signal provided from the controller IC 214. The lens barrel may be moved to the target position by the driving signal generated in the driving circuit unit 216. The driving circuit unit 216 may include the bidirectionally driven H-bridge circuit to apply the driving signal to the driving coil 220 in a voice coil motor scheme. When the driving circuit unit 216 is driven in the voice coil motor scheme, the control signal provided from the controller IC 214 may be applied to a control terminal of a switch element included in the H-bridge circuit.

However, even when the control signal is generated by applying the control gain to the error value, the displaced position of the lens barrel may fail to converge to the target position and oscillate. The oscillation of the lens barrel may be caused by oscillation of the error value. Here, the 'oscillation' may refer to a state in which due to disturbance, the error value does not enter a normal state and either overshoot or undershoot continues to occur even after elapse of a settling time.

According to one or more examples, the controller IC 214 may determine whether or not the error value is in the oscillation state by comparing each error value sequentially input with the reference values thereof, and may move the lens barrel to the target position by changing the control gain when it is determined that the error value is in the oscillation state.

Figure 4:
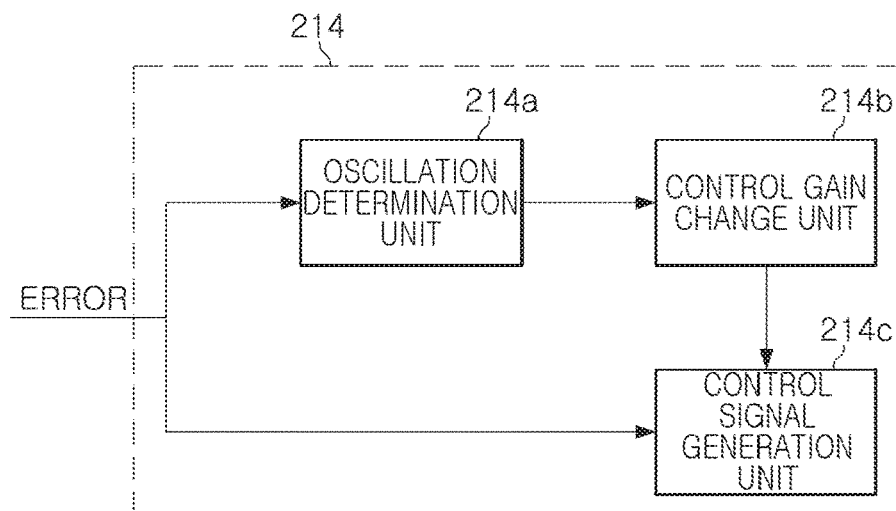
FIG. 4 is a block diagram showing a controller integrated circuit (IC) according to one or more examples of the present disclosure.

FIG. 4 is a block diagram showing a controller integrated circuit (IC) according to one or more examples of the present disclosure.

Referring to FIG. 4, the controller IC 214 according to one or more examples may include an oscillation determination unit 214a, a control gain change unit 214b and a control signal generation unit 214c.

The oscillation determination unit 214a may determine whether or not the oscillation occurs by comparing each error value sequentially input from the comparison unit 212 in FIG. 3 with a first reference value and a second reference value. For example, the first reference value may be greater than a value of the target position of the lens barrel, and the second reference value may be smaller than the value of the target position of the lens barrel.

The control gain change unit 214b may change the control gain currently applied to the error value when it is determined that the oscillation occurs based on a result of the oscillation determination of the oscillation determination unit 214a.

The control signal generation unit 214c may generate the control signal based on an initial control gain in its initial state. For example, the initial control gain may be set to a default value. When the oscillation occurs, the control signal generation unit 214c may generate the control signal based on the control gain changed by the control gain change unit 214b.

The oscillation determination unit 214a may determine whether or not the oscillation occurs for each of a plurality of control sections. The oscillation determination unit 214a may determine whether or not the oscillation occurs based on the error value after the elapse of the settling time among the error values sequentially input. Here, the settling time may refer to a time required for the error value to enter the steady state when the oscillation does not occur, which may be determined in advance. For example, each of the plurality of control sections may correspond to a frame unit of an image signal output from the image sensor.

According to one or more examples, it is possible to determine whether or not the oscillation occurs in real time by determining whether or not the oscillation occurs for each frame unit of the image signal.

The oscillation determination unit 214a may determine at least twice whether or not the oscillation occurs in one control section. Hereinafter, for convenience of explanation, it is assumed that the oscillation determination unit 214a determines twice whether or not the oscillation occurs in the one control section. Here, in the section in which it is determined twice whether or not the oscillation occurs, a section in which it is first determined whether or not the oscillation occurs may be referred to as a first oscillation determination section and a section in which it is secondly determined whether or not the oscillation occurs may be referred to as a second oscillation determination section. Here, the first oscillation determination section and the second oscillation determination section may each correspond to a section after the settling time of each error value sequentially input. For example, the first oscillation determination section may correspond to a first period of the error value after the elapse of the settling time, and the second oscillation determination section may correspond to a second period of the error value after the elapse of the settling time.

The oscillation determination unit 214a may determine that the first oscillation occurs in a case in which an error value at one time point is greater than the first reference value and an error value at another time point is smaller than the second reference value among the error values sequentially input in the first oscillation determination section. That is, the oscillation determination unit 214a may determine that the first oscillation occurs in a case in which both overshoot and undershoot occur in the first oscillation determination section.

Alternatively, the oscillation determination unit 214a may determine that the first oscillation does not occur in a case in which all of the error values sequentially input are smaller than the first reference value or the error values sequentially input are greater than the second reference value in the first oscillation determination section.

According to one or more examples, it may be determined that the first oscillation occurs in a case in which both the error value greater than the first reference value and the error value smaller than the second reference value are detected in the first oscillation determination section. Therefore, reliability of the oscillation determination may be improved.

When it is determined that the first oscillation occurs in the first oscillation determination section, the oscillation determination unit 214a may then determine whether or not the second oscillation occurs in the second oscillation determination section.

The oscillation determination unit 214a may determine that the second oscillation occurs in a case in which an error value at one time point is greater than the first reference value or smaller than the second reference value among the error values sequentially input in the second oscillation determination section. That is, the oscillation determination unit 214a may determine that the second oscillation occurs in a case in which either of overshoot or undershoot occurs in the second oscillation determination section.

Alternatively, the oscillation determination unit 214a may determine that the second oscillation does not occur in a case in which all of the error values sequentially input are smaller than the first reference value and greater than the second reference value in the second oscillation determination section.

Unlike in the first oscillation determination section, the oscillation determination unit 214a may determine that the second oscillation occurs in a case in which either of overshoot or undershoot occurs in the second oscillation determination section. Therefore, the oscillation determination unit 214a may thus quickly modify the occurring oscillation.

When it is determined that the first oscillation occurs in the first oscillation determination section, the control gain change unit 214b may change the initial control gain to a first compensation control gain. For example, the first compensation control gain may have a higher integral control gain $K_I$ than the initial control gain. For another example, the first compensation control gain may have a lower derivative control gain $K_D$ than the initial control gain. For another example, the first compensation control gain may have a higher integral control gain $K_I$ and a lower derivative control gain $K_D$ than the initial control gain.

In addition, when it is determined that the second oscillation occurs in the second oscillation determination section, the control gain change unit 214b may change the first compensation control gain to a second compensation control gain. For example, the second compensation control gain may have a higher integral control gain $K_I$ than the first compensation control gain. For another example, the second compensation control gain may have a lower derivative control gain $K_D$ than the first compensation control gain. In addition, the second compensation control gain may have a higher integral control gain $K_I$ and a lower derivative control gain $K_D$ than the first compensation control gain.

It may be assumed that the first oscillation occurs in the first oscillation determination section, but the second oscillation does not occur in the second oscillation determination section. In this case, the control gain change unit 214b may maintain the first compensation control gain until an end of a current control section and reset an initial control gain of a next control section to a default value.

However, it may be assumed that the first oscillation occurs in the first oscillation determination section, and the second oscillation occurs in the second oscillation determination section. In this case, in order to end the oscillation state quickly, the control gain change unit 214b may set the second compensation control gain applied at the end of the current control section as the initial control gain of the next control section.

Figure 5:
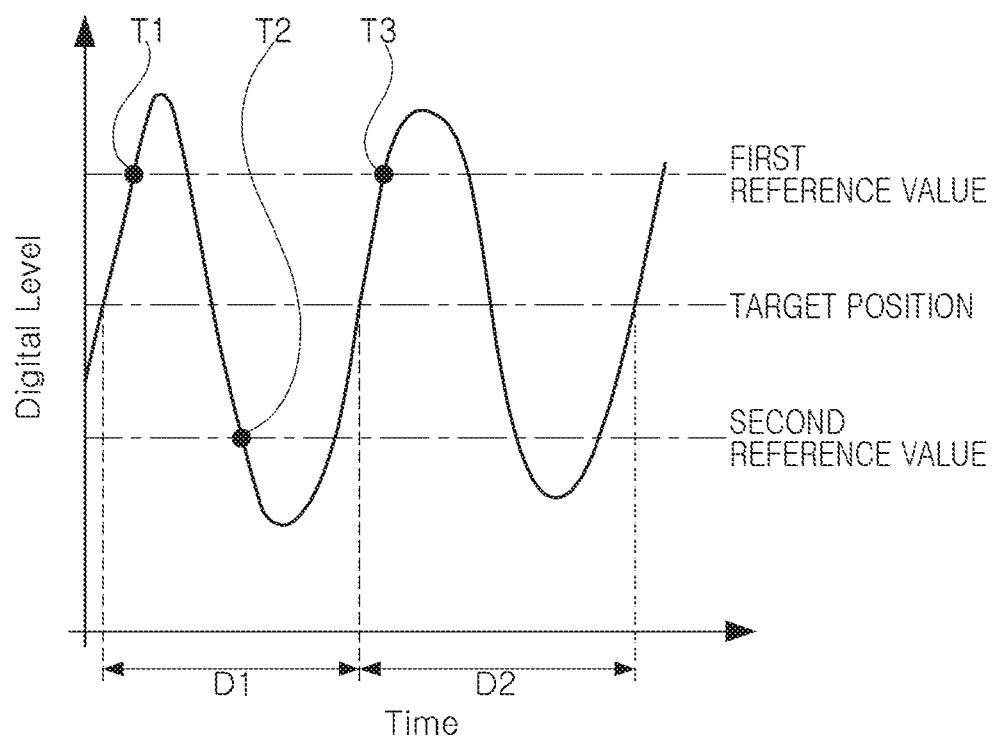
FIG. 5 shows a graph of error values when a first oscillation occurs in a first oscillation determination section and a second oscillation occurs in a second oscillation determination section.

FIG. 5 shows a graph of error values when a first oscillation occurs in a first oscillation determination section and a second oscillation occurs in a second oscillation determination section. The error values shown in FIG. 5 may correspond to the error values after the elapse of the settling time in the graph.

Referring to FIG. 5, it may be confirmed that in the graph of the error values, the error value does not converge to the target position, and the oscillation state is maintained by overshoot and undershoot. In FIG. 5, the first oscillation determination section may correspond to the first period of the error value, and the second oscillation determination section may correspond to the second period of the error value.

Referring to FIG. 5, after a time point T1 of the first oscillation determination section D1, the error value is greater than the first reference value, and after a time point T2 of the first oscillation determination section D1, the error value is smaller than the second reference value. Therefore, the oscillation determination unit 214a may determine that the first oscillation occurs at the time point T2.

When it is determined that the first oscillation occurs in the first oscillation determination section D1, the control gain change unit 214b may change the initial control gain currently applied to the control signal generation unit 214c to the first compensation control gain.

When the initial control gain is changed to the first compensation control gain by the control gain change unit 214b, the control signal generation unit 214c may generate the control signal based on the first compensation control gain.

Referring to FIG. 5 again, after a time point T3 of the second oscillation determination section D2, the error value is greater than the first reference value. Therefore, the oscillation determination unit 214a may determine that the second oscillation occurs at the time point T3.

When it is determined that the second oscillation occurs in the second oscillation determination section D2, the control gain change unit 214b may change the first compensation control gain currently applied to the control signal generation unit 214c to the second compensation control gain. In addition, the first oscillation occurs in the first oscillation determination section and the second oscillation occurs in the second oscillation determination section; therefore, the control gain change unit 214b may set the second compensation control gain as the initial control gain of the next control section.

When the first compensation control gain is changed to the second compensation control gain by the control gain change unit 214b, the control signal generation unit 214c may generate the control signal based on the second compensation control gain.

Figure 6:
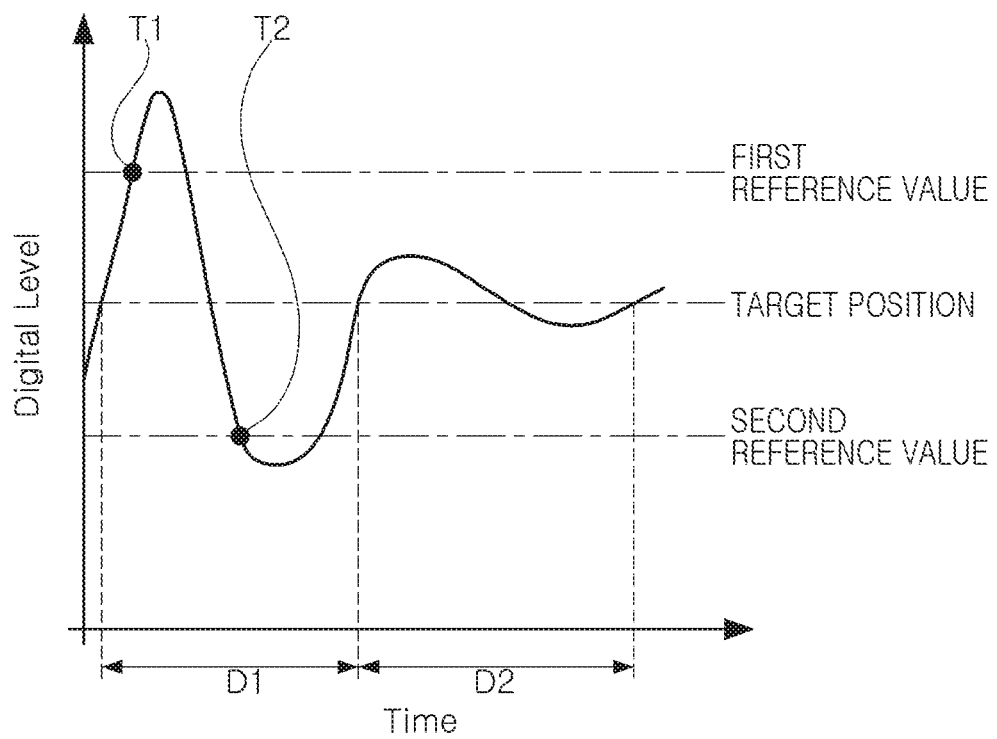
FIG. 6 shows a graph of error values when the first oscillation occurs in the first oscillation determination section and the second oscillation does not occur in the second oscillation determination section.

FIG. 6 shows a graph of error values when the first oscillation occurs in the first oscillation determination section and the second oscillation does not occur in the second oscillation determination section. The graph of FIG. 6 is similar to the graph of FIG. 5. Therefore, the further description may omit overlapping explanations and focus on the differences.

Referring to FIG. 6, after the time point T1 of the first oscillation determination section D1, the error value is greater than the first reference value, and after the time point T2 of the first oscillation determination section D1, the error value is smaller than the second reference value. Therefore, the oscillation determination unit 214a may determine that the first oscillation occurs at the time point T2.

When it is determined that the first oscillation occurs in the first oscillation determination section D1, the control gain change unit 214b may change the initial control gain currently applied to the control signal generation unit 214c to the first compensation control gain.

When the initial control gain is changed to the first compensation control gain by the control gain change unit 214b, the control signal generation unit 214c may generate the control signal based on the first compensation control gain.

Referring to FIG. 6 again, in the second oscillation determination section D2, the error value is smaller than the first reference value and greater than the second reference value. Therefore, the oscillation determination unit 214a may determine that the second oscillation does not occur.

In this case, the control gain change unit 214b may maintain the first compensation control gain until an end of the current frame and reset the initial control gain of the next control section to the default value.

As set forth above, according to the examples described herein, it is possible to determine whether or not the oscillation occurs in real time by determining whether or not the oscillation occurs for each frame unit of the image signal.

According to the examples described herein, it may be determined that the oscillation occurs in a case in which both overshoot and undershoot occur in the first oscillation determination section. Therefore, the reliability of the oscillation determination may be improved.

Unlike in the first oscillation determination section, it may be determined that the second oscillation occurs in a case in which either of overshoot or undershoot occurs in the second oscillation determination section. Therefore, it may be possible to quickly modify the occurring oscillation.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator of a camera module, comprising:
a comparison unit sequentially calculating each error value by comparing a target position with a current position of a lens barrel;
a controller integrated circuit (IC) generating a control signal by applying a control gain based on a proportional-integral-derivative (PID) control scheme to each error value sequentially input thereto from the comparison unit; and
a driving circuit unit generating a driving signal in response to the control signal to move the lens barrel to the target position,
wherein the controller IC changes the control gain in response to the error values sequentially input comprising both overshoot and undershoot.

2. The actuator of claim 1, wherein the controller IC determines that a first oscillation occurs in response to the error values sequentially input comprising both overshoot and undershoot after elapse of a settling time among the error values.

3. The actuator of claim 2, wherein the controller IC changes an initial control gain of the control signal to a first compensation control gain in response to the first oscillation.

4. The actuator of claim 3, wherein the first compensation control gain comprises a higher integral control gain and a lower derivative control gain than the initial control gain.

5. The actuator of claim 3, wherein the controller IC determines that a second oscillation occurs in response to the error values sequentially input comprising one or more of overshoot and undershoot after the first oscillation.

6. The actuator of claim 5, wherein the controller IC changes the first compensation control gain of the control signal to a second compensation control gain in response to the second oscillation.

7. The actuator of claim 6, wherein the second compensation control gain comprises a higher integral control gain and a lower derivative control gain than the first compensation control gain.

8. The actuator of claim 7, wherein the controller IC sets the second compensation control gain as an initial control gain of a next control section in response to the second oscillation.

9. The actuator of claim 5, wherein the controller IC maintains the first compensation control gain as the control gain of a current control section and resets an initial control gain of a next control section to a default value in response to a determination of no second oscillation.

10. The camera module comprising:
the actuator of claim 1;
a housing accommodating the lens barrel capturing an image of a subject; and
an image sensor converting the image of the subject into an electrical signal.

11. A controller integrated circuit (IC) comprising:
an oscillation determination unit determining oscillation of each error value sequentially input in one control section at least twice;
a control gain change unit changing a control gain applied to the error value based on a result of the oscillation determination of the oscillation determination unit; and
a control signal generation unit generating a control signal by applying the control gain changed by the control gain change unit to the error value,
wherein the oscillation determination unit determines that a first oscillation occurs in a case in which an error value at one time point is greater than a first reference value and an error value at another time point is less than a second reference value among the error values sequentially input.

12. The controller IC of claim 11, wherein the first reference value is greater than the second reference value.

13. The controller IC of claim 11, wherein the oscillation determination unit determines whether or not the first oscillation occurs after a settling time of the error value.

14. The controller IC of claim 13,
wherein the oscillation determination unit changes an initial control gain of the control signal to a first compensation control gain in a case in which the first oscillation occurs, and
the first compensation control gain has a higher integral control gain and a lower derivative control gain than the initial control gain.

15. The controller IC of claim 14, wherein the oscillation determination unit determines that a second oscillation occurs in a case in which an error value at one time point is greater than the first reference value or less than the second reference value among the error values sequentially input after the first oscillation occurs.

16. The controller IC of claim 15,
wherein the control gain change unit changes the first compensation control gain of the control signal to a second compensation control gain in a case in which the second oscillation occurs, and
the second compensation control gain has a higher integral control gain and a lower derivative control gain than the first compensation control gain.

17. The controller IC of claim 11, wherein the control section corresponds to a frame unit of an image signal output from an image sensor.

18. A camera module, comprising:
an actuator configured to move a lens barrel in one or more of an optical axis direction, a first direction perpendicular to the optical axis, and a second direction perpendicular to the optical axis;
a housing accommodating the lens barrel; and
an image sensor configured to convert an image of a subject captured by the lens barrel into an electrical signal,
wherein the actuator comprises:
a comparison unit configured to sequentially compare a target position with a current position of the lens barrel to determine sequential error values;
a controller integrated circuit (IC) configured to sequentially receive each error value and apply a control gain based on a proportional-integral-derivative (PID) control scheme to each error value to generate a control signal; and
a driving circuit unit configured to generate a driving signal in response to the control signal to move the lens barrel to the target position,
wherein the controller IC is configured to change the control gain in response to overshoot and undershoot of the sequential error values.

19. The camera module of claim 18, wherein the controller IC further comprises an oscillation determination unit configured to determine the overshoot in response to an error value at one time point being greater than a first reference value and the undershoot in response to an error value at another time point being less than a second reference value from the sequential error values.

* * * * *